March 19, 1957 P. L. MAGILL 2,785,985
GLASS CONTAINERS FOR ALCOHOLIC BEVERAGES
Filed March 9, 1954
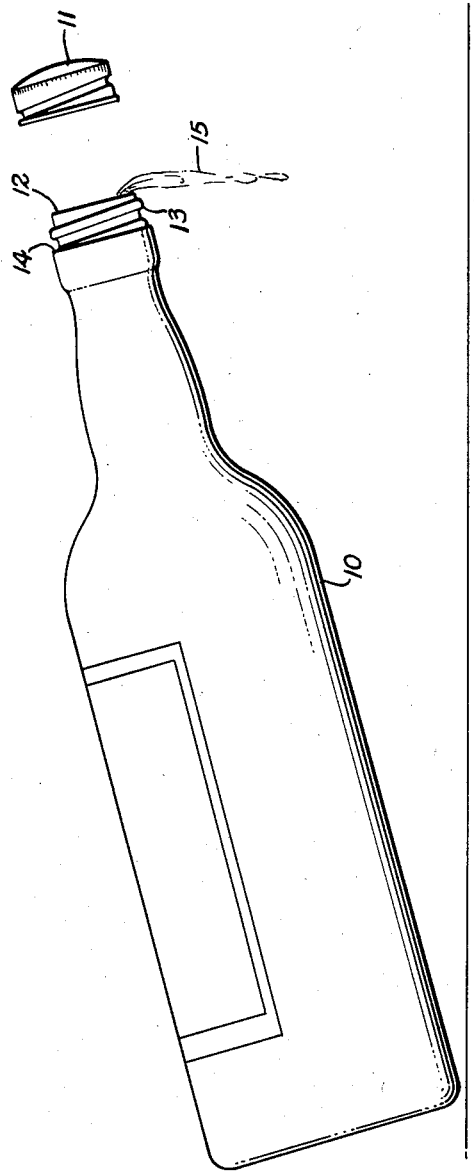
INVENTOR:
PAUL L. MAGILL

United States Patent Office 2,785,985
Patented Mar. 19, 1957

2,785,985

GLASS CONTAINERS FOR ALCOHOLIC BEVERAGES

Paul L. Magill, Menlo Park, Calif.

Application March 9, 1954, Serial No. 415,101

2 Claims. (Cl. 99—171)

This invention relates to glass containers for alcoholic beverages and to a method of treating them to prevent dripping when the contents are poured therefrom. More particularly the invention relates to a wine bottle treated to prevent drops adhering to the outside of the neck or mouth of the bottle when a portion of the alcoholic content has been poured therefrom as in serving.

The invention is illustrated by a drawing which shows diagrammatically, a bottle which has been treated to prevent dripping as described hereinafter.

In the dispensing of alcoholic beverages from glass containers, particularly glass bottles, it has heretofore been impossible to prevent dripping from the mouth and neck of the bottle when pouring beverages containing approximately 5% alcohol or more. In the case of such beverages, dripping is aggravated by the high wetting power of the alcohol contained in the beverage resulting from the low surface tension of ethyl alcohol in comparison with water. The presence of alcohol in concentration of about 5% or more, causes the beverage liquid to creep down the outside of the mouth and neck of the bottle and drip off when the bottle is tipped back toward an upright position. The wetting action of the alcohol is so great that dripping is not prevented by the natural oil film which is present in a nearly mono-molecular layer on most all glass exposed to the atmosphere for a short time.

Many attempts to solve the problem of dripping beverage bottles have heretofore been made, such as the provision of detachable pouring spouts, flaring lips and water repellent coatings. These latter have not been successful, partly because the oils and waxes used for the purpose failed to adhere to the glass and in some cases, contaminated the beverage, whose flavor is very sensitive to foreign materials. Furthermore, the capping, sealing, labelling and/or pasteurizing operations often ruptured or removed the antidripping wax film previously applied, allowing the penetrating alcoholic beverage to creep over the neck of the bottle and cause dripping, staining of the label and soiling of the hands.

One object of my invention is to prevent dripping of alcoholic beverages when dispensed from glass bottles, by coating the external mouth of the bottle with a substance which is repellent to alcoholic beverages and which bonds to the glass as an almost invisible, inseparable film. Another object of the invention is to provide an anti-drip bottle which can be filled, sealed, capped and/or pasteurized without subsequent treatment and without loss in effectiveness of the antidrip coating.

I have discovered that an imperceptible coating of polysiloxane or silicone resin on the surface of the glass forming the mouth of the bottle will effectively prevent dripping of alcoholic beverages having an alcohol content between about 5% and 35%. To become most effective, the resin is applied in a solvent to the area over the lip of the bottle and from the mouth of the bottle to the shoulder below the cap, in the case of screw cap bottles such as that shown in the drawing. It is preferred to apply the coating to the external surface of the mouth but there is no objection to allowing it to extend on the inside inasmuch as the coating adheres to the glass and does not contaminate the contents. The solvent is then allowed to evaporate and the resin cured by heating at about 250°–300° C. for 30 minutes to one or two hours. After cooling, the bottle is then filled and capped any time thereafter. A resin solution containing about 1 to 5% of resin, e. g. 2%, can be applied to the bottle while yet hot from the tempering lehr in the manufacturing operation, thus avoiding reheating. In this case, the solution of silicone resin is suitably applied as a spray. Suitable solvents are perchloro-ethylene, refined heavy naphtha, ethylene chloride and amyl acetate.

The polysiloxane preferred for my purpose is the dimethyl polysiloxane prepared from dimethyl silicon chloride monomer by hydrolysis and polymerization. The resin has the empirical formula of the type:

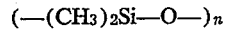

$$(-(CH_3)_2Si-O-)_n$$

I may also use the diethyl and the dipropyl polysiloxanes, the phenyl polysiloxanes, and alkyl, aryl and aralkyl polysiloxanes in general and mixture thereof.

On further heating in contact with glass, the polysiloxane undergoes further polymerization and appears to chemically bond to the glass. The glass so treated is highly repellent to alcoholic solutions up to about 35% concentration by volume and is found to retain this repellency for an indefinite time.

Referring to the drawing, the glass bottle 10 is shown in inclined position as in pouring with cap 11 removed. The mouth 12 and threaded area 13 are completely coated with a film of polysiloxane down to the shoulder 14. When the bottle is tipped back toward the vertical position, the stream of beverage liquid 15, having failed to wet the mouth of the bottle, separates sharply, the inner part returning entirely into the bottle leaving none on the outer surface 12 and 13 to drip.

The coating on surfaces 12 and 13 can be applied by dipping the bottle in inverted position into a shallow bath of the polysiloxane solution, or only the edge of the mouth 12, may be coated, for example by brushing or contacting with a roller or a pad wet with the resin solution. This operation can be made fully mechanical, thereby reducing the cost to a minimum.

Another method of applying the silicone coating to the mouth of the beverage bottle is by exposing it to the vapor of a chlorosilane, for example dimethyl dichlorosilane, thereby coating a film of the chlor silane on the surface of the glass. This film is later hydrolysed, for example, by ammonia, then further polymerized by heat. Such a method is described in U. S. Patent 2,306,222.

As an example of my invention, a wine bottle, ⅕ gallon capacity, was coated around the lip area with a film of Dow-Corning 200 silicone, applied as a 2% solution in dichlor ethylene. The coating was then hardened by heating to 300° C. for one hour in an oven. Under these conditions, polymerization of the resin occurred. After cooling, the bottle was filled with wine of about 12% alcohol content and capped with a conventional crown cap having a cork liner. When the bottle was opened, the wine was poured from it without the slightest dripping and entirely without contamination.

When applying silicone resin to the mouth of a beverage bottle, it is desirable to confine it to the area round the mouth and beneath the cap as has been described. If the resin coating extends below this area, it may interfere with the adhesion of the label and the revenue stamp when one is applied.

In the case of bottles sealed with a crown cap, the coating should extend over the ridge or ring just below the mouth of the bottle over which the cap is crimped. The resin on the mouth of the bottle serves to prevent adhesion or seizure of the cap gasket to the glass and facilitates removing the cap in a cleanly manner. This is particularly true of cork lined caps which often tend to adhere to the glass, leaving bits of cork on the lip. I employ the term "polysiloxane" in the claims for any polysiloxane having a hydrocarbon radical attached to silicon. I also intend the claims to include the obvious expedients such as the addition of a dye or pigment to identify the coated areas of the containers. Methylene blue or alizarine red are examples of dyes for the purpose.

Having thus described my invention, what I claim is:

1. A non-dripping glass bottle filled with alcoholic beverage having an alcoholic concentration in the range of 5 to 35%, said bottle having a film of hardened polysiloxane resin only on and surrounding the outer surface of the mouth thereof restricted to the external area about the mouth of said bottle.

2. The bottle of claim 1 wherein said alcoholic beverage is a wine having an alcohol content of about 12 percent.

References Cited in the file of this patent

UNITED STATES PATENTS

| | | |
|---|---|---|
| 739,514 | Street | Sept. 22, 1903 |
| 2,012,487 | Swanson | Aug. 27, 1935 |
| 2,214,004 | White et al. | Sept. 10, 1940 |
| 2,504,482 | Goldman | Apr. 18, 1950 |
| 2,573,637 | Bender | Oct. 30, 1951 |
| 2,622,598 | Rosenblum | Dec. 23, 1952 |
| 2,664,230 | Heim | Dec. 29, 1953 |
| 2,688,568 | Miskel et al. | Sept. 7, 1954 |